Figure 1:
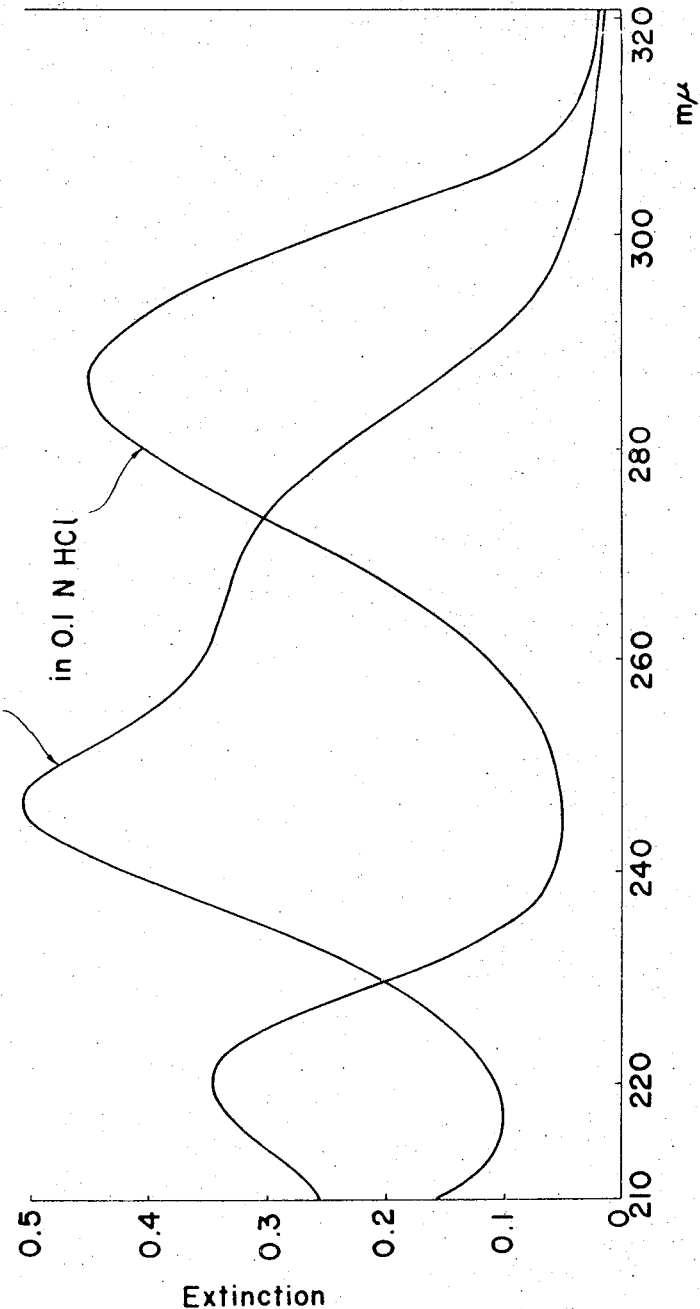

United States Patent [19]
Umezawa et al.

[11] 3,835,170
[45] Sept. 10, 1974

[54] HYPOTENSIVE AGENT, OUDENONE, ITS SALTS AND PROCESSES FOR PRODUCTION AND PREPARATION THEREOF

[75] Inventors: Hamao Umezawa, Tokyo; Osamu Tanabe, Kyoto; Tomio Takeuchi, Tokyo, all of Japan

[73] Assignee: Zaidan Hojin Biseibutsu Kagaku Kenkyu Kai, Tokyo, Japan

[22] Filed: Jan. 15, 1971

[21] Appl. No.: 106,746

[30] Foreign Application Priority Data
Feb. 3, 1970   Japan.................................. 45-8984
May 12, 1970   Japan................................ 45-39772

[52] U.S. Cl......... 260/438.1, 260/347.8, 260/586 R, 424/285, 424/294, 424/331
[51] Int. Cl.............................................. C07c 49/32
[58] Field of Search........... 260/347.8, 586 R, 438.1

[56] References Cited
FOREIGN PATENTS OR APPLICATIONS
1,505,738   12/1966   France............................ 260/586 R

OTHER PUBLICATIONS
Umezawa et al. "Chem. Abstracts," Vol. 74, p. 98120W, (1971).

*Primary Examiner*—Leon Zitver
*Assistant Examiner*—Norman Morgenstern
*Attorney, Agent, or Firm*—Brady, O'Boyle & Gates

[57] ABSTRACT

A hypotensive compound designated oudenone and metal salts of oudenone, oudenone being produced by a process which comprises cultivating a strain of a mushroom in an aqueous nutrient medium until substantial amount of oudenone is accumulated in said medium and then recovering oudenone from said medium and metal salts of oudenone being produced by adding inorganic or organic metal compound to oudenone solution.

2 Claims, 3 Drawing Figures

UV spectra of oudenone (5mcg/ml) in neutral (phosphate buffer, pH 7.0) and acidic solution (0.1 N HCl)

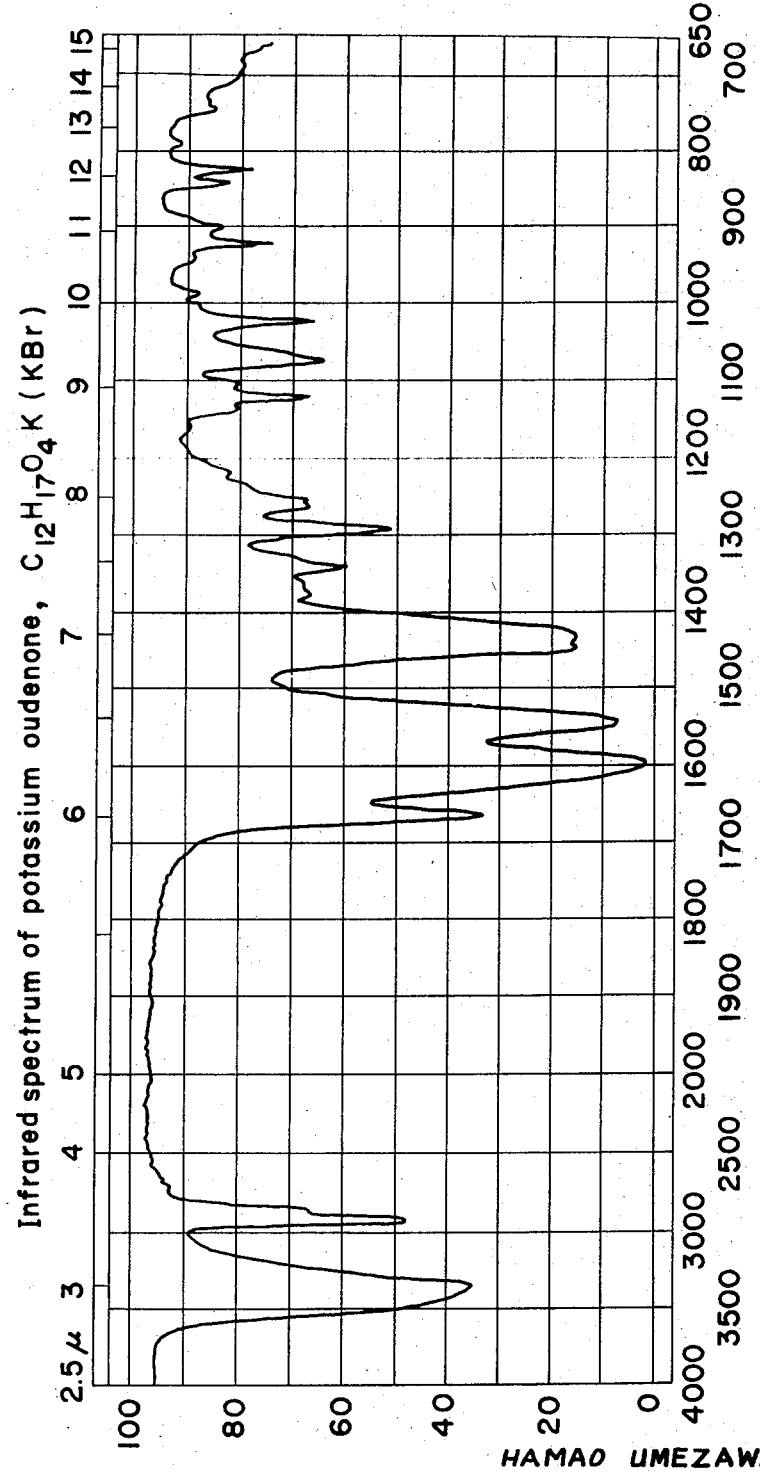

HYPOTENSIVE AGENT, OUDENONE, ITS SALTS AND PROCESSES FOR PRODUCTION AND PREPARATION THEREOF

This invention relates to a new hypotensive agent called oudenone and processes for production and preparation thereof. More particularly, it relates to processes for its production by fermentation and processes for its recovery and purification. This invention embraces this hypotensive agent and its salts in dilute solutions, as crude concentrates, as crude solids, as purified solids and in pure crystalline forms. This substance is effective in inhibiting the growth of tyrosine hydroxylase and in lowering blood pressure. This substance is useful for treatment of hypertensive diseases.

There is now provided, according to the present invention, a hypotensive agent and its salts effective in inhibiting tyrosine hydroxylase and in reducing blood pressure, said hypotensive substance being soluble in water, methanol, ethanol, propanol, butanol, acetone, methylisobutylketone, ethyl acetate, butyl acetate, chloroform, benzene and insoluble in ether, hexane, petroleum ether, showing a maximum at 246 m$\mu$ in the phosphate buffer (pH 7.0) solution and two maxima at 221 m$\mu$ and 285 m$\mu$ in its 0.1N HCl solution, giving positive reactions to 2,4-dinitrophenylhydrazine and tetrazolium reagents, but negative reactions to Fehling and Tollens reagents, giving crystals which melts at 77° – 79°C, being optically active ($[\alpha]_D^{20}= -10.6°$ in 0.5 percent ethanol), showing about 4.1 of pK′ by titration of the aqueous solution, having the molecular formula of $C_{12}H_{16}O_3$, exhibiting characteristic absorption bands in the infrared region of the spectrum when pelleted with potassium bromide at the following wave numbers in cm$^{-1}$: 3400, 2900, 1710, 1660, 1560, 1455, 1420, 1380, 1300, 1270, 1255, 1195, 1170, 1130, 1100, 1050, 1015, 990, 980, 955, 935, 895, 885, 860, 840, 820, 810, 780. Oudenone which crystalizes from hexane has the following structure:

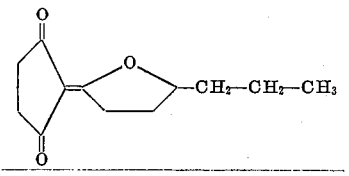

FIG. 1 indicates the ultraviolet absorption spectra of oudenone in phosphate buffer of pH 7.0 and 0.1N HCl.

Figure 2:
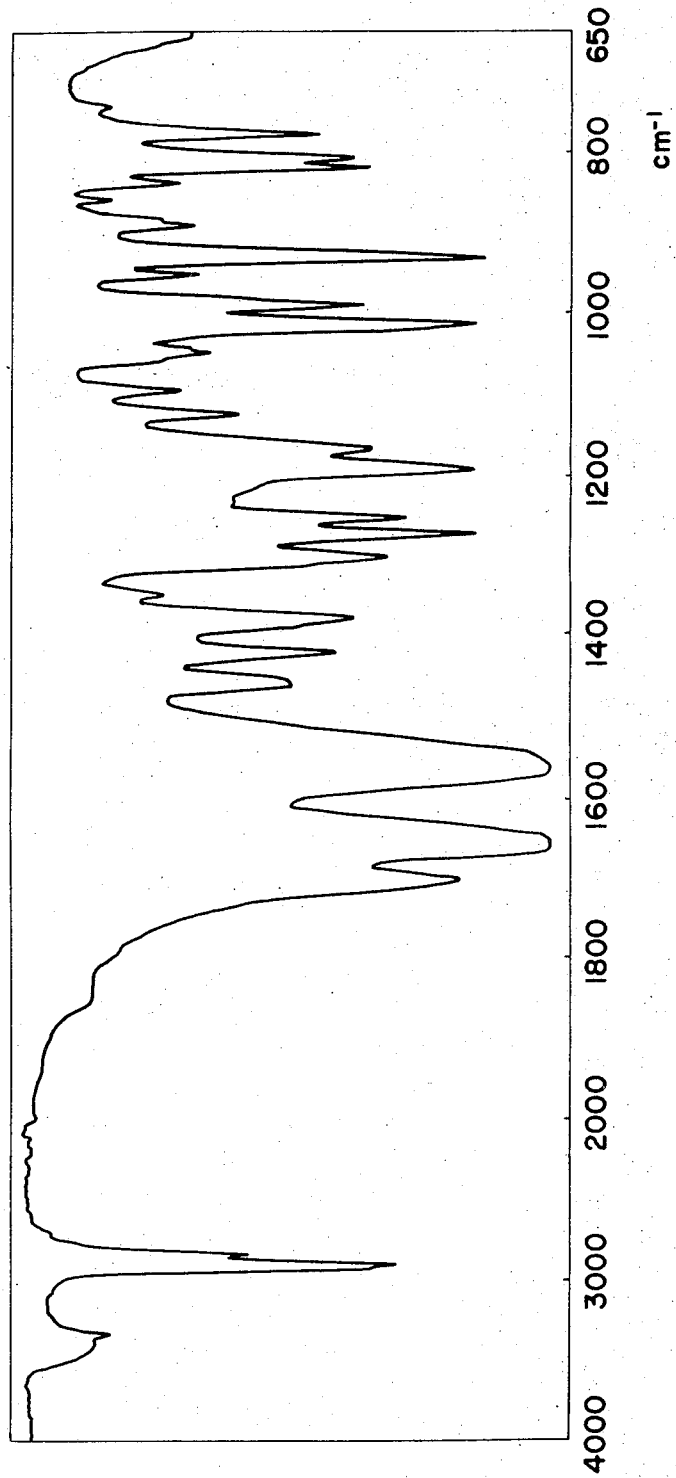

FIG. 2 indicates the infrared absorption spectrum of oudenone pelleted in potassium bromide.

FIG. 3 indicates the infrared spectrum of potassium oudenone pelleted in potassium bromide.

There is further provided, according to the present invention, the processes for production of oudenone which comprises cultivating an oudenone-producing microorganism in an aqueous medium containing carbon sources and nitrogen sources under aerobic conditions until accumulation of a substantial amount of oudenone in said solution. Oudenone in the cultured broth can be shown by the spectrophotometric determination or by the activity to inhibit tyrosin hydroxylase.

Oudenone is a new compound discovered by the present inventors. The organism producing oudenone was first found by the present inventors and was collected under needle-leaved trees at Kirizumiyama in Gumma prefecture. It is a kind of mushroom. It was cultivated and designated the strain 10F in the inventors' institute (Institute of Microbial Chemistry, Shinagawa-ku, Tokyo). It has been deposited in Kogyo Gijutsuin Hakko Kenkyujo in Chiba prefecture and added to its permanent collection as No. 503 and it has been also deposited in American Type culture collection and the number ATCC No. 20295 was given. It forms the fruit body when it is cultivated on a saw-dust medium (10 g of a saw-dust was mixed with 60 cc of a medium containing 2.0 percent glucose and 0.5 percent dry yeast, placed in a flask of 500 cc medium, and sterilized at 120°C for 20 minutes) at 27°C. The fruit body thus formed is the Collybia type. Pileus is 4 – 11 cm in diameter. At the biginning the pileus is convex and thereafter opens and becomes plain and the central part of the pileus rises slightly. When it is wet, the surface is mucous and light brown or light grayish brown. Veins (wrinkles) in radiated or net-like form are observed. Lamella is loose, white to yellowish white and directly links to the stem. The inside of the stem is vacant and the spore-print is white. Comparing with known mushrooms, the strain 10F have properties common with *Oudemansiella* and among known three species of *Oudemansiella* it is most closely related to *Oudemansiella radicata*.

The mushrooms are classified by their morphology of the fruit body, but it is not completely certain that the fruit body which is formed on the artificial medium is completely identical with that in nature. The strain 10F, when its early growth on the saw-dust medium described above was examined, it resembled *Pseudohiatula ohshimae*, Hongo et Matsuda. However, when it grew fully, as described above, it was classified as *Odemansiella radicata*. It has been known that the same compound is often found in cultured material of various fungi and various mushrooms. According to the present invention, there is now provided the spectrophotometric method of determination of oudenone, and now it is easy to find oudenone in cultured materials of microorganisms.

The present invention also provides processes for recovery and purification of oudenone. The spectrophotometric method of determination of oudenone is also useful to establish efficient processes for the extraction and the purification. The words "oudenone-producing strain" employed in the present invention embraces the strain 10F and all variants and all mutants thereof. It embraces all organisms which produce oudenone and cannot be definitely differentiated from the strain 10F, its variants and its mutants.

According to the present invention, oudenone is produced by cultivating the oudenone-producing strain aerobically. For the production of oudenone, cultivation on a solid medium is possible, but for production of the large quantity the cultivation in a liquid medium is preferred. For instance, the strain 10F is cultivated on an agar slant consisting of 2.0 percent glucose, 0.5 percent dry yeast, 1.5 percent agar (sterilized at 120°C for 20 minutes, pH was not adjusted, and pH after the sterilization was about 5.6), and the mycelial growth on the agar slant is inoculated to a medium in which oudenone is produced. There is another efficient method of inoculation: the oudenone-producing strain is cultivated on a saw-dust medium as described above at 27°C for 10 – 20 days, the medium including the mycelium is suspended in a fresh medium (for instance, that consisting of 2.0 percent glucose and 0.5 percent dry yeast), and the suspension is inoculated to a medium in which oudenone is produced.

It is also possible to inoculate the cultured broth obtained by the shaking culture or the deep aerated fermentation to a medium in which oudenone is produced. The oudenone-producing strain can grow at 20° – 35°C, but it is preferable to cultivate the oudenone-producing strain at 25° – 30°C for production of oudenone. To cultivate the oudenone-producing strain, materials known as nutrients for micro-organisms can be employed. For instance, glucose, maltose, dextrin, starch, lactose, sucrose, glycerol or acetic acid can be used as the carbon source. Adding the following carbon sources to the basal medium consisting of 0.5 percent peptone, 0.3 percent dry yeast, 0.3 percent $KH_2PO_4$, 0.1 percent $MgSO_4 \cdot 7H_2O$, 0.1 percent NaCl, production of oudenone in media containing various carbon sources by the shaking culture at 27°C for 14 days was examined. The oudenone-producing strain cultivated on the saw-dust medium for 14 days at 27°C was suspended in a medium consisting of 2.0 percent glucose, and 0.5 percent dry yeast and 10 cc of the suspension was inoculated to each medium of 120 cc placed in 500 cc flask. Then, the production of oudenone (mcg/cc) in the cultured liquid and the growth (abundant growth +++, growth in medium ++, a slight growth +) were as follows: glucose: 59 mcg/cc on 7 day, 300 mcg/cc and +++ en 10 day; maltose: 7 mcg/cc on 7 day, less than 5 mcg/cc and ++ on 10 day; dextrin: 12.5 mcg/cc on 7 day, less than 5 mcg/cc and ++ on 10 day; starch 5 mcg/cc on 7 day, less than 5 mcg/cc and ++ on 10 day; lactose: 25 mcg/cc on 7 day, 100 mcg/cc and + on 10 day; sucrose: 14 mcg/cc on 7 day, 15 mcg/cc and ++ on 10 day; glycerol: 19 mcg/cc on 7 day, 215 mcg/cc and +++ on 10 day; sodium acetate: less than 5 mcg/cc on 7 and 10 day, 18 mcg/cc and + on 15 day. Vegetable oils such as soybean oil, sesame oil etc., and animal fats such as lard oil etc. can be used for production as the carbon source and also as an antifoaming agent. Oudenone consists of carbon, hydrogen and oxygen, and does not contain nitrogen. However, nitrogenous materials which are known to be useful for growth of microorganisms can be employed to cultivate the oudenone-producing strain. For instance, peptone, meat extract, yeast, yeast extract, soybean meal, cotton seed meal, peanut meal, cornsteep liquor, rice bran and inorganic nitrogenous materials can be employed to cultivate the oudenone-producing strain. For instance, oudenone was produced by the shaking culture of the oudenone-producing strain in the following media: A medium consisting of 2.0 percent glucose, 0.5 percent peptone, 0.3 percent $KH_2PO_4$, 0.1 percent $MgSO_4 \cdot 7H_2O$ (pH was not adjusted); B medium consisting of 2.0 percent glucose, 1.0 percent cornsteep liquor (pH 5.6); C medium consisting of 2.0 percent glucose, 1.0 percent soybean meal, 0.5 percent dry yeast (pH 5.6). Each medium of 125 cc was placed in a flask of 500 cc volume and the oudenone-producing strain which was grown on the saw-dust medium was inoculated as described above. Then, the production of oudenone and pH were as follows:

| Days | A medium | | B medium | | C medium | |
|---|---|---|---|---|---|---|
| | pH | mcg/cc | pH | mcg/cc | pH | mcg/cc |
| 5 | 4.4 | 11 | 4.8 | <5 | 4.4 | 15 |
| 7 | 4.4 | 5 | 4.4 | 12 | 4.4 | 64 |
| 8 | 4.4 | 11 | 4.8 | 29 | 4.4 | 88 |
| 11 | 4.4 | 62 | 4.6 | 100 | 5.0 | 95 |
| 12 | 4.8 | 158 | 5.0 | 215 | 4.8 | 229 |
| 15 | 5.2 | 180 | 5.2 | 255 | 5.6 | 475 |

As shown by the examples described above peptone, cornsteep liquor, soybean meal, dry yeast are example of nitrogen sources suitable for production of oudenone. Peanut meal, cotton seed meal, casein and casein hydrolysate were found also to be nitrogen sources suitable for the production of oudenone. It is also possible to add inorganic salts, and if necessary a minute amount of heavy metal salts is added.

For production of oudenone by fermentation, the fermentation processes employed for production of antibiotics can be used: for instance, it is produced by shaking culture or by aerated deep fermentation, and antifoaming agents such as vegetable oils, animal fats or silicone resin are added.

Oudenone can be determined by testing its activity to inhibit tyrosin hydroxylase. The method has been described in Journal of Antibiotics 21, 350 – 352 page, 1968. A spectrophotometric method for determination of oudenone was invented by the present invention: a solution of oudenone to be tested is diluted with 1/15M phosphate buffer of pH 7.0 (the times of the dilution is $n$) and the optical density (a) of the diluted solution in 1 cm cuvette is read at 246 m$\mu$; the solution to be tested is diluted with 0.1N HCl (the times of the dilution is $n$) and the optical density (b) in 1 cm cuvette at 246 m$\mu$ is read; the amount of oudenone in the solution tested is calculated as follows:

$$(a-b)n/1000 - 60 \times 10^4 = \text{mcg/cc of oudenone in the solution}$$

When the oudenone-producing strain was cultivated in a liquid medium, oudenone exists both in the liquid part and in the solid part of the cultured broth. For example, when the oudenone-producing strain was shake-cultured in a medium consisting of 2.0 percent glucose and 0.5 percent peptone (125 cc of the medium was placed in a flask of 500 cc volume) and oudenone in the liquid part and in the solid part was determined, the following amounts of oudenone were found in 10 cc of the cultured broth (oudenone in the solid part was extracted with methanol and determined spectrophotometrically):

| Days | mcg of oudenone in the liquid part | mcg of oudenone in the solid part |
|---|---|---|
| 5 | 372 | 185 |
| 7 | 845 | 365 |
| 8 | 1300 | 410 |
| 11 | 2180 | 342 |

As cleared by the present invention, oudenone is soluble in water, methanol, ethanol, butanol, ethyl acetate, butyl acetate, chloroform and benzene and it is transferred from the aqueous solution to the water-immiscible solvents such as butanol, ethyl acetate, butyl acetate, chloroform and benzene. The partition coefficient determined was as follows: butanol-water: 8 at pH 2.0, 7.5 at pH 3, 4 at pH 4, 2.5 at pH 5, 2.5 at pH 6, 3 at pH 8, 0.6 at pH 9, 0.8 at pH 10; ethyl acetate-water: 5 at pH 2.0, 4 at pH 3, 1.5 at pH 4, 0.2 at pH 5, less than 0.1 at pH 6; butyl acetate-water: 3 at pH 2, 2.5 at pH 3, 1 at pH 4, 0.1 at pH 5, less than 0.1 at pH 6; chloroform-water: 19 at pH 4, 1 at pH 5 and 0.1 at pH 6. The partition coefficient between methylisobutylketone-water was examined by testing the activity to inhibit tyrosine hydroxylase and they were as follows: 1 at pH 2, 1 at pH 3, 0.3 at pH 4, 0.1 at pH 5, 0.1 at pH 6.

Oudenone is stable at pH 2.0, 7.0 and 9.0: no reduction of the activity occurs after 30 minutes at 60°C and after 5 minutes at 100°C. Oudenone in aqueous solution can be extracted to a water-immisible solvent at acid. Oudenone in the solution can be concentrated by distillation to remove the solvent. Oudenone in a water-immiscible organic solvent can be transfered into water at neutral or alkaline reaction as shown by the partition coefficient. For instance, oudenone in the fermented broth can be extracted with butanol, ethyl acetate, butyl acetate, chloroform, etc. at pH 2 − 3. For this extraction a multistage extractor can be used to give the efficient extraction. This process of the extraction can be applied to the whole broth including mycelium. Concentration of the solvent containing oudenone by distillation or distillation under reduced pressure gives syrup or dry crude powder from which oudenone can be crystallized. Crystallization gives white crystals of oudenone. In this process, if necessary, the cultured broth is filtered and oudenone in the filtrate is recovered by the process described above and oudenone in the solid part is extracted with methanol, ethanol, acetone, ethyl acetate, butyl acetate, chloroform, etc. For crystallization of small amount of oudenone, hexane or hexane-benzene are examples of solvents suitable for the crystallization, however, in the case of large quantity, the solvents in which oudenone is more soluble, for instance, water, methanol, ethanol, butanol, ethyl acetate, acetone, benzene and chloroform can be employed. For the crystallization, there is also such a method to add a solvent in which oudenone is insoluble to an oudenone solution.

If a material to be crystallized contains impurities to prevent the crystallization, then oudenone is transferred from a water-immiscible solvent to the water layer at neutral or alkaline reaction and it is extracted from the aqueous solution to a water-immiscible solvent at acid. If necessary, oudenone can be purified by a chromatography. For instance, silica gel chromatography using benzene-ethyl acetate (1 : 2) is an example of the suitable methods.

As cleared by the present invention, oudenone has acid property and therefore, an anion exchange resin process can be employed for extraction and isolation of oudenone. For instance, when 130 cc of fermented broth containing 310 mcg/cc of oudenone was passed through a column filled with 20 cc of Dowex 1 × 2 resin (marketed by Dow Chemical, U.S.A.) in Cl⁻ form, and after the column was washed with distilled water oudenone on the column was eluted with 0.2N HCl. Then, 16 mg of oudenone appeared in No. 2 − 9 fractions (after passing 0.2N HCl, the eluate was cut into each 20 g). An anion exchange resin 1RA-400 (marketed by Rhom and Haas, U.S.A.) is also an example of resins useful for extraction of oudenone. Using an anion exchange resin process oudenone can be obtained from the fermented broth in the yield of more than 75 percent. Oudenone can be precipitated from its solution depending on its acid property. For instance, oudenone can be precipitated from its aqueous solution by adding cupric ion. Treatment of the precipitate with acid and extraction with an organic solvent followed by the evaporation gives oudenone as crude or purified state.

AS above described, according to the present invention, oudenone can be recovered by solvent extraction processes, absorption and elution processes, precipitation processes and distillation processes.

Oudenone which is obtained by the present invention has the following properties and the following biological activities:

Oudenone crystals (white platelet) obtained by recrystallization from hexane or benzene-hexane melts at 77° − 79°C, has the formula of $C_{12}H_{16}O_3$ (elementary analysis: calcd.: C 69.21, H 7.74, O 23.05; found: C 69.5, H 7.86, O 23.01; $C_{12}H_{16}O_3$ by the high resolution mass spectroscopy), is soluble in water, methanol, ethanol, propanol, butanol, acetone, methylisobutylketone, ethyl acetate, butyl acetate, benzene, chloroform an insoluble in ether, petroleum ether and hexane, is optically active ($[\alpha]_D^{20} = -10.6°$, 0.5 percent ethanol). Its phosphate buffer (1/15M) solution (10 mcg/cc) of pH 7.0 shows a maximum at 246 m$\mu$ ($E_{1\,cm}^{1\,percent} = 1,000$) and its solution (10 mcg/cc) in 0.1N HCl shows two maxima at 221 m$\mu$ ($E_{1\,cm}^{1\,percent} = 625$) and at 285 m$\mu$ ($E_{1\,cm}^{1\,percent} = 963$). It shows the following bands in the infrared spectrum when pelleted with potassium bromide: 3400, 2900, 1710, 1660, 1560, 1455, 1420, 1380, 1300, 1270, 1255, 1195, 1170, 1130, 1100, 1050, 1015, 990, 980, 955, 935, 895, 885, 860, 840, 820, 810, 780 cm$^{-1}$. It has the acidic property and is transferred into a water-immiscible solvent at acid and from the solvent into water at pH larger than 5 − 6. It is adsorbed by anion exchange resin and the titration shows pK' about 4.1. It gives positive reactions to 2,4-dinitrophenylhydrazine, hydroxamic acid-ferric chloride, tetrazolium, but negative reactions to Fehling and Tollens. It absorbes two moles of hydrogen with palladium carbon, yielding $C_{12}H_{20}O_3$. On silica gel thin layer chromatography using butanol-acetic acid-water (4 : 1 : 1) $Rf$ is about 0.7 and using benzene-ethyl acetate (2 : 1) $Rf$ is about 0.1.

Oudenone at 100 mcg/cc shows no inhibition against growth of the following bacteria growing on a nutrient agar: *S. aureus*, *E. coli* (K12), *S. typhosa*, *S. dysenteriae*, *K. pneupmoniae*, *B. anthracis*, *B. subtilis*, *Mycobacterium* 607, and no inhibition against *Pyricularia oryzae*, *Candida albicans*, *Saccharomyces cervisiae*, *Penicillium chrysogenum* growing in a glucose nutrient agar. It showed inhibition against *Pyricularia oryzae* at 12.5 mcg/cc, when this fungus grew in a rice plant juice medium of pH 5.0.

The compound which has the formula of $C_{12}H_{16}O_3$ and melts at 75° − 80°C has not been known, and oudenone is a new compound. It was also shown by the structure. It has low toxicity to animals. When oudenone is dissolved in distilled water (pH was 2.3) and administered to mice, $LD_{50}^-$ was 138 mg/kg by the intravenous injection, 163 mg/kg by the intraperitoneal injection, 1,000 mg/kg by the subcutaneous injection and 1,100 mg/kg by the oral administration. When oudenone was dissolved in distilled water and neutralized, $LD_{50}$ was 1,270 mg/kg by the intravenous injection, 1,310 mg/kg by the intraperitoneal injection, 1,400 mg/kg by the subcutanous injection and 2,200 mg/kg by the oral administration. When 160 mg/kg, 40 mg/kg or 10 mg/kg of oudenone was orally or intraperitoneally given daily for 30 days, except decrease of the blood pressure, none of toxic signs appeared.

Effect of oudenone on tyrosin hydroxylase was tested by the following method: the reaction mixture contained 0.1 μmole of L-tyrosine-$^{14}$C (1.1 × 10$^5$cpm), 1 μmole of 2-amino-4-hydroxy-6,7-dimethyltetrahydropteridine, 0.1 cc of tyrosine hydroxylase solution (1 mg as protein/cc), 200 μmole of acetate buffer of pH 6.0, 100 μmole of mercaptoethanol, 100 mcg, 50 mcg, 25 mcg, 12.5 mcg or 0 mcg of oudenone in 1.0 cc; after 15 minutes at 30°C, 3,4-dihydroxyphenylalanine-$^{14}$C was separated by alumina chromatography and determined by the radioactivity. In this test, the following inhibition percent was observed at the following concentrations of oudenone: 74.1 percent at 100 mcg/cc, 57.6 percent at 50 mcg/cc, 39.0 percent at 25 mcg/cc, 30.6 percent at 12.5 mcg/cc. This inhibition was not reversed by addition of $Fe^{++}$ at 1 × 10$^{-3}$M. When the results were plotted according to Lineweavor-Burk equation, then oudenone showed uncompetitive relation with tyrosine and competitive relation with 2-amino-4-hydroxy-6,7-dimethyltetrahydropteridine.

The structure (I, shown below) of oudenone crystallized from hexane was determined. As shown by the structure formula, oudenone has no carboxyl group, but it has acid property as already described. As described below, metal salts of oudenone have the formula of $(C_{12}H_{17}O_4^-)_nM$ (M forms $M^{n+}$ ion). Now it is certain that oudenone can have the following structures (I, II, III, IV).

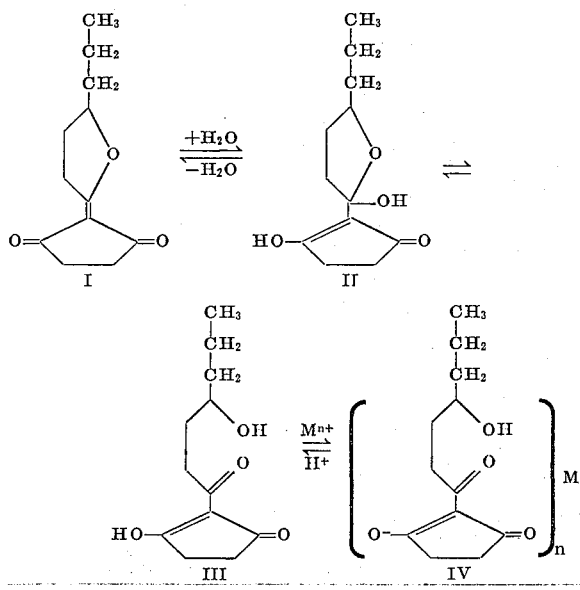

($M^{n+}$ means metal ions. For instance, $Ca^{++}$ is $M^{2+}$)

This invention embraces all forms of oudenone above described. During biosynthesis of oudenone, in the cultured liquid oudenone exists mainly as II, III and IV, and it exists mainly as I when it is extracted into a water-immiscible organic solvent. The present invention embraces not only the processes for preparation of I from II, III and IV, but also the processes for preparation of IV from I, II and III and the processes for preparation of II and III from I and IV. According to the present invention, there is now provided salts of oudenone with bases and the processes for preparation thereof. According to the present invention, from the compounds, I, II, III which were shown above, metal salts of oudenone can be prepared.

According to the present invention, to a solution of oudenone inorganic or organic metal compounds which give easily metal ions are added, if necessary water is added, and salts of oudenone (IV) is prepared by removing solvents or by crystallization. For instance, to oudenone dissolved in ethyl acetate sodium 2-ethylhexoate is added and sodium oudenone which precipitates is crystallized; to oudenone which is converted to II and III in water, $KHCO_3$ is added to pH 6.0, and potassium oudenone crystallizes by evaporation of the solution with n-butanol added to make the evaporation easy; to oudenone which is converted to II and III in water barium hydroxide is added to pH 6.0, and the evaporation with n-butanol added gives crystalline barium oudenone. As shown by the maxima in the ultraviolet absorption of oudenone in water, 1/15M phosphate buffer of pH 7.0 described above and as shown by the molecular formula of the salts described below, oudenone reacts with water and forms the compound II and III. Also, the compounds II and III and their racemic forms can be prepared by the chemical synthesis. The present invention embraces processes for preparing metal salts of oudenone and its racemic form from II or III obtained by chemical synthesis.

Salts of oudenone have the following properties: Sodium oudenone: white crystalline powder, m.p. 145° – 148°C; anal. calcd. for $C_{12}H_{17}O_4Na$: C 58.05, H 6.90, O 25.77, Na 9.26; found: C 57.79, H 7.32, O 24.96, Na 8.77. Potassium oudenone: white crystals, m.p. 116° – 117°C; anal. calcd, for $C_{12}H_{17}O_4K$: C 54.51, H 6.48, O 24.20, K 14.78; found: C 55.73, H 6.77, O 23.6, K 13.37. Calcium oudenone: white crystals, m.p. 167° – 169°C; anal. calcd. for $(C_{12}H_{17}O_4)_2Ca$: C 58.76, H 6.98, O 26.09, Ca 8.15; found: C 58.40, H 7.15, Ca 8.19. Magnesium oudenone: white crystals, m.p. 252° – 255°C; calcd. for $(C_{12}H_{17}O_4)_2Mg$: C 60.70, H 7.21, Mg 5.01; found: C 60.53, H 7.62, Mg 5.15. Barium oudenone: white crystals, m.p. 135° – 138°C; calcd. for $(C_{12}H_{17}O_4)_2Ba$: C 49.03, H 5.82, O 21.77, Ba 23.36; found: C 49.24, H 6.01, O 20.00, Ba 22.91. Aluminium oudenone is obtained as a white powder. Sodium, potassium, calcium, or magnesium oudenone which gives pH about 6 – 7 in water can be used for oral administration and injection.

Since the present invention disclosed the acidic property and structures of oudenone in solutions and principles of processes for preparation of salts of oudenone with bases, many modifications of the processes described can be easily made. The present invention embraces those salts which can be made by processes modified from those described herein and processes thereof.

Hydroxylation of tyrosine is the rate-limiting step of norepinephrine biosynthesis. Therefore, inhibition of tyrosine hydroxylase results in inhibition of norepinephrin synthesis in vivo which results in lowering the blood pressure. If norepinephrine synthesis in brain cells is reduced, it exhibits a sedative effect. The injection of a large dose of oudenone to mice or rats did not cause sleeping and the sedative effect was not recognized. Therefore, it is suggested that blood brain barrier inhibits penetration of oudenone into brain cells. As already described, daily injection or daily oral administration of oudenone to rats lowered blood pressure. The hypotensive effect can be seen more markedly, when oudenone is given to genetically hypertensive rats which was developed by Prof. Okamoto, Medical School, University of Kyoto. When 6.25 mg/kg was intraperitoneally injected to a rat of 183 mm blood pressure and another rat of 193 mm, then the blood pressure was lowered to 115 – 145 mm and 150 – 170 mm respectively during 1 – 22 hours after the injection. When 3.13 mg/kg was injected to a rat of 173 mm, then the pressure was reduced to 140 – 148 mm during 1 – 22 hours after the injection. When 25 mg/kg was intraperitoneally injected to a rat of 190 mm, the pressure was reduced to 140 – 163 mm during 1 – 22 hours after the injection. The oral administration of oudenone daily (3.1 mg/kg, 6.25 mg/kg, 12.5 mg/kg, 25 mg/kg) for three days showed marked reduction of blood pressure. It caused 20 – 30 percent reduction which continued for about 5 days after the last oral administration.

Oudenone inhibits tyrosine hydroxylase and reduces blood pressure. Therefore, the combination with other hypotensive agents causes stronger effect. Especially, the combination with reserpine causes the strong effect.

Examples of processes for production and preparation of oudenone and its salts are described below. According to the present invention, properties of oudenone and a spectrophotometric determination method of oudenone were cleared and processes for production and preparation were invented. Therefore, it is easy to find a process by modification of the methods described in this invention. The present invention embraces all of processes made by modification of the present invention.

Example 1

The strain 10F which had been cultured on an agar slant medium consisting of 2.0 percent glucose, 0.5 percent dry yeast and 1.5 percent agar was inoculated to a saw-dust medium in four flasks. The saw-dust medium was prepared as follows: 10 g of saw-dust (from *Magnolia hypoleuca*) was added to 60 cc of the medium consisting of 2.0 percent glucose and 0.5 percent dry yeast, placed in 500 cc volume flask and sterillized at 120°C for 20 minutes. It was incubated for 14 days at 27°C. Two hundred fifty cc of the medium consisting of 2.0 percent glucose and 0.5 percent dry yeast was added to each flask and shaken, and the suspension thus prepared from four flasks were inoculated to 150 liters of the medium which consisted of 2.0 percent glucose, 0.5 percent peptone, 0.3 percent dry yeast, 0.3 percent $KH_2PO_4$, 0.1 percent $MgSO_4 \cdot 7H_2O$, and which was placed in a stainless steel fermenter of 400 liters volume and which had been sterilized at 120°C for 20 minutes. The fermentation was continued under stirring of 200 r.p.m. and aeration of 150 liters of sterile air per minute at 27°C. The pH was 5.68 at 0 hour, 5.1 at 45 hours, 4.6 at 55 hours, 4.35 at 65 hours, 4.8 at 83 hours, 4.7 at 96 hours. The reducing sugar was decreased gradually and it was 0.53 percent at 96 hours. The amount of oudenone in the culture filtrate was as follows: 19.5 mcg/cc at 40 hours, 91 mcg/cc at 65 hours, 94 mcg/cc at 71 hours, 605 mcg/cc at 80 hours. The fermentation was stopped at 97 hours and the cultured broth was made pH 3.0 with hydrochloric acid and filtered and 110 liters of the filtrate were obtained. It contained 607 mcg/cc of oudenone. The wet mycelial cake was 4.1 kg and contained 2.0 g of oudenone.

To the culture filtrate 100 liters of n-butanol were added, mixed and separated, and again 50 liters of n-butanol were added. The butanol extracts were combined (the final volume was 166 liters and contained 49.8 g of oudenone. The combined butanol extract was concentrated to the syrup by distillation under reduced pressure. The syrup was dissolved in 800 cc of mixture of benzene-ethyl acetate (2 : 1 in volume) and the solution was passed through silica gel column (1.75 kg of silica gel was suspended in the benzene-ethyl acetate). The diameter of the column was 4 cm. The benzene-ethyl acetate (2 : 1) (6 liters) was further passed and 6 liters of benzene ethyl acetate (1 : 1) were passed. Thereafter, 30 liters of benzene-ethyl acetate (1 : 2) were passed. Then, the eluate containing 28.6 g (1,100 mcg/cc) of oudenone was obtained. The concentration of the eluate by distillation under reduced pressure gave a syrup weighing 40 g. To the syrup 3 liters of hot hexane was added and the cooling gave 17 g of oudenone crystals. Crystallization of oudenone from the mother liquor yielded another 8 g of oudenone.

Oudenone in the mycelia cake was extracted with 8 liters of methanol, and the extract was concentrated to 1.5 liters by distillation under reduced pressure. It was adjusted to pH 3.0 with hydrochloric acid and extracted with 1.5 liters and 0.75 liters of n-butanol. The butanol extracts were combined and concentrated to syrup and the syrup was dissolved in 100 cc of benzene-ethyl acetate (2 : 1) and treated by the silica gel chromatography using 120 g of the silica gel in a column. It yielded 1.0 g of oudenone by the similar procedure as described above.

Example 2

The mycelium suspension of the oudenone-producing strain was prepared by the process as described in Example 1, that is, the cultivation of the strain 10F on the saw-dust medium. Ten cc of the suspension was inoculated to 125 cc of the medium which was placed in 500 cc volume flask and consisted of 2.0 percent glucose, 0.5 percent peptone, 0.3 percent dry yeast, 0.3 percent $KH_2PO_4$, 0.1 percent $MgSO_4 \cdot 7H_2O$ and was shake-cultured for 11 days at 27°C. Thus, 1,000 cc of the cultured broth was obtained (310 mcg/cc). It was passed through a column of IRA-400 (marketed by Rhom and Haas, U.S.A.). Fifty cc of the resin in Cl⁻ was placed in a column of 2 cm in diameter. The distilled water (100 cc) was passed and thereafter 350 cc of 0.1N HCl was passed. The eluate contained 250 mg of oudenone. To the eluate, 350 cc and 100 cc of n-butanol were added successively and the concentration of the butanol extracts by distillation under reduced pressure yielded the syrup. The syrup was dissolved in benzene, and haxane was added to precipitate oudenone. Thus, 150 mg of oudenone crystals was obtained.

Example 3

The strain 10F was cultivated by the method as described in Example 1. The fermentation was stopped at 96 hours. The culture filtrate contained 500 mcg/cc of oudenone, and the mycelial cake in 1.0 cc of the cultured broth contained 80 mcg of oudenone. Hundred liters of this cultured broth were made pH 2.5 with HCl and extracted with 100 liters and 50 liters of n-butanol successively. The butanol extracts were combined (52 g of oudenone was contained) and concentrated to the syrup by distillation under reduced pressure. Oudenone in the syrup was extracted by addition of 4 liters and 1 liter of ethyl acetate successively. The ethyl acetate extracts were combined and added to 1.5 liters of water. Under mixing, the water layer was made pH 7.0 with 10N NaOH and the water layer was separated. The water layer contained 41 g of oudenone. The water layer was made pH 3.0 with HCl and oudenone was extracted with 3 liters and 1 liter of ethyl acetate successively. The ethyl acetate layers were combined and evaporated to the syrup. The syrup was dissolved in 3 liters of hot hexane and cooled. It yielded 18 g of oudenone crystals and another 11 g of oudenone crystals was obtained by concentration of the mother liquor.

Example 4

To 5.0 cc of 0.02M oudenone solution (4.17 mg/cc) 0.02M $CuSO_4$ was added drop by drop (temperature was 17°C). Then, blue cupric salt of oudenone was precipitated. The precipitate was maximum when 2.45 – 3.0 cc of 0.02M $CuSO_4$ was added. The supernatant contained 2.08 mg/cc of oudenone. This precipitate was separated by filtration and dried, yielding 9.5 mg of cupric salt of oudenone.

Example 5

Oudenone crystals (m.p. 77.5° – 78.5°C) of 650 mg was dissolved in ethyl acetate of 20 cc. Four cc of sodium 2-ethylhexoate solution in methyliso-butylketone (45.2 percent v/v) was added. It was stirred for 65 minutes at room temperature. Sodium oudenone which precipitated was separated by filtration and washed with 5 cc of ethyl acetate and dried, yielding 670 mg of sodium oudenone, m.p. 145° – 148°C. Its aqueous solution showed pH 6.0 and it was soluble in water, methanol, ethanol, but insoluble in ethyl acetate, benzene and acetone.

Example 6

Crude crystals of oudenone (1.18 g, m.p. 74° – 76°C) was dissolved in 25 cc of ethyl acetate and 0.25 cc of distilled water was added. To this solution, 2.65 cc of sodium 2-ethylhexoate solution in methylisobutylketone (45.2 percent v/v) was added. It was stirred for 2 hours at room temperature, and further stirred at 10°C for 1 hour. Sodium oudenone which precipitated was separated and washed with 5 cc of ethyl acetate and dried, yielding 1.35 g of sodium oudenone crystals. $E_{1\ cm}^{1\ percent}$ at 246 m$\mu$ in the neutral solution was 853 and $E_{1\ cm}^{1\ percent}$ in the acidic solution at 285 m$\mu$ was 765.

Example 7

Thirty gram of a syrup which was obtained by extraction of fermented beer of an oudenone-producing strain with $n$-butanol and the distillation under reduced pressure and which contained 12 g of the active compound as oudenone was dissolved in 400 cc of ethyl acetate and to this solution 70 cc of sodium 2-ethylhexoate solution methylisobutylketone (45.2 percent v/v) was added. After stirring for 60 minutes at room temperature, it was kept overnight in cold room. Sodium oudenone which crystallized was washed with 40 cc of ethyl acetate and dried, yielding 10.7 g of sodium oudenone. $E_{1\ cm}^{1\ percent}$ at 246 m$\mu$ in the neutral aqueous solution was 842 and $E_{1\ cm}^{1\ percent}$ at 285 m$\mu$ in acid solution was 760.

This sodium oudenone (IV, $M^{n+}$ is Na+) of 2.0 g was dissolved in 40 cc of distilled water and extracted with 40 cc of butyl acetate. It was shaken for 10 minutes at pH 2.0 with 3N HCl, and the butyl acetate layer was separated. The same procedure was repeated again and the butyl acetate extracts were combined and dehydrated with sodium sulfate. It was concentrated to the syrup under reduced pressure. From the syrup oudenone was crystallized from 100 cc of cyclohexane. One gram of oudenone crystals (m.p. 76° – 78°C) was obtained.

Example 8

Oudenone crystals of 2.08 g was dissolved in 50 cc of distilled water, and 1.0 g of $KHCO_3$ was added. Then, pH became 6.0. To this solution, 150 cc of $n$-butanol was added and the mixture was distilled under reduced pressure. Then, crystals appeared and 100 cc of $n$-butanol was further added and the distillation was combined. The white crystals which appeared were collected by filtration and washed with $n$-butanol and dried, yielding 2.39 g of potassium oudenone crystals, m.p. 116° – 117°C. pH of 10 mg/cc solution was 6.95. $E_{1\ cm}^{1\ percent}$ in 99 percent methanol at 246 m$\mu$ was 592, $E_{1\ cm}^{1\ percent}$ at 246 m$\mu$ in the neutral aqueous solution was 788 and $E_{1\ cm}^{1\ percent}$ in the acidic solution at 285 m$\mu$ was 672.

Example 9

By the similar procedure as described in Example 8 but using 185 mg of calcium hydroxide instead of potassium bicarbonate, 0.89 g of calcium oudenone was prepared from 1.04 g of oudenone.

Example 10

By the similar procedure as described in Example 8 but using 787 mg of $Ba(OH)_2 \cdot 8H_2O$ instead of potassium bicarbonate, 1.28 g of barium oudenone was prepared from 1.04 g of oudenone.

Example 11

By the similar procedure as described in Example 8 but using 145 mg of magnesium hydroxide instead of potassium bicarbonate, 0.64 g of magnesium oudenone was prepared from 1.04 g of oudenone.

Example 12

By the similar procedure as described in Example 8 but using 420 mg of sodium bicarbonate instead of potassium bicarbonate, 1.2 g of sodium oudenone was prepared from 1.04 g of oudenone.

What we claim is:

1. A process for the preparation of metal salts of oudenone having the structural formula

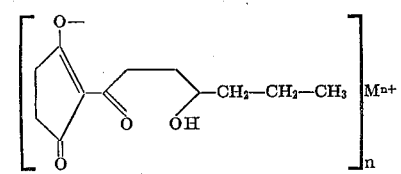

wherein M is a sodium, potassium, calcium, magnesium, barium, or copper cation and n is the valence of said cation, which comprises adding oudenone having a structural formula:

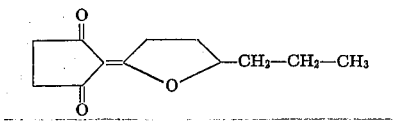

to a solvent selected from the group consisting of water, methanol, ethanol, butanol, ethyl acetate, butyl acetate, chloroform and benzene and therefore adding a salt selected from the group consisting of sodium-2-ethylhexoate, potassium bicarbonate, barium hydroxide, copper sulfate, calcium hydroxide, magnesium hydroxide and sodium bicarbonate and recovering the said metal salt of oudenone.

2. A metal salt of oudenone having the structural formula:

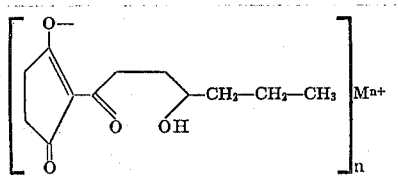

where M is a sodium, potassium, calcium, magnesium, barium, aluminum or copper cation and $n$ is the valence of said cation.

* * * * *